United States Patent [19]

Schiemann

[11] 4,354,154

[45] Oct. 12, 1982

[54] MEASURING TRANSFORMER FOR HIGH-VOLTAGE SWITCH-GEAR WITH METAL ENCAPSULATION

[75] Inventor: Heinz Schiemann, Berlin, Fed. Rep. of Germany

[73] Assignee: Siemens Aktiengesellschaft, Berlin and Munich, Fed. Rep. of Germany

[21] Appl. No.: 23,774

[22] Filed: Mar. 26, 1979

Related U.S. Application Data

[63] Continuation of Ser. No. 552,939, Feb. 25, 1975, abandoned.

[30] Foreign Application Priority Data

Feb. 25, 1975 [DE] Fed. Rep. of Germany ....... 2409990

[51] Int. Cl.³ .................... G01R 15/04; H01F 40/06
[52] U.S. Cl. .................... 324/126; 324/127; 336/84 C; 336/174; 336/175
[58] Field of Search ............ 324/127, 126, 133; 174/11 BH, 28, 142, 143; 336/84 R, 84 C, 174, 175; 361/270

[56] References Cited

U.S. PATENT DOCUMENTS

| 1,709,826 | 4/1929 | Austin | 336/174 |
| 3,222,625 | 12/1965 | Ledocq | 336/174 |
| 3,652,778 | 3/1972 | Sakai | 174/28 |
| 3,959,761 | 5/1976 | Graul | 336/84 |
| 3,990,001 | 11/1976 | Schiemann | 336/174 |

FOREIGN PATENT DOCUMENTS

| 1100796 | 3/1961 | Fed. Rep. of Germany | 336/174 |
| 1488796 | 4/1969 | Fed. Rep. of Germany | 336/174 |
| 1538244 | 4/1969 | Fed. Rep. of Germany | 336/174 |
| 45-26021 | 12/1970 | Japan . | |
| 514923 | 12/1971 | Switzerland . | |
| 309109 | 4/1929 | United Kingdom | 336/174 |

OTHER PUBLICATIONS

PTB-Mitteilungen; 1/73; p. 38.

Primary Examiner—Ernest F. Karlsen
Attorney, Agent, or Firm—Kenyon & Kenyon

[57] ABSTRACT

A measuring transformer for use with high-voltage switch-gear of a type which employs metal encapsulation. The transformer is retained between flanges at a joint of the metal encapsulation and includes a sealing and insulating spacing means. The latter forms a ring-shaped cavity with the flanges and seals such cavity from the interior of the metal encapsulation. In the ring-shaped cavity is disposed at least one iron core having a secondary winding placed thereon, the latter core together with the inner conductor of the high-voltage switch-gear forming a current transformer.

13 Claims, 8 Drawing Figures

MEASURING TRANSFORMER FOR HIGH-VOLTAGE SWITCH-GEAR WITH METAL ENCAPSULATION

RELATED APPLICATIONS

This application is a continuation of application Ser. No. 552,939, filed Feb. 25, 1975, now abandoned.

BACKGROUND OF THE INVENTION

1. Field of the Invention

The invention relates to a measuring transformer for use with high-voltage switch-gear of a type employing metal encapsulation and, in particular, to a measuring transformer which is retained between flanges at a joint of the metal encapsulation of the switch-gear.

2. Description of the Prior Art

In one known measuring transformer of the aforementioned type ("PTB-Mitteilungen," 1/73, page 38), cores with secondary windings are assembled on a cylindrical aluminum part which has two flanges. One flange serves to fasten another flange part, which part engages over the cores having the secondary windings, while the other flange of the cylindrical aluminum part connects with a flange of the metal encapsulation at a joint thereof. By means of another flange, the over engaging part is assembled to another flange of the metal encapsulation so that the transformer, formed by the two parts, with the iron cores including secondary windings housed between them, is retained at a joint between the flanges of the metal encapsulation.

The aforesaid design of the known measuring transformer is relatively complicated because it employs a first cylindrical aluminum casting as support for the iron cores having the secondary windings and another casting to cover up such cores. As a result, the transformer is relatively expensive to manufacture.

It has also been proposed (German patent application No. P 23 25 441.3) to employ for the assembly of a measuring transformer within a metal capsule of a switch-gear installation an annular mounting attachment which is attached to the measuring transformer and clamped between the flanges of the metal capsule. In such a transformer, however, the active-system thereof comprising the iron cores and secondary windings is disposed entirely inside the metal capsule.

It is an object of the present invention to provide a measuring transformer for use with high-voltage switch-gear which is of a simple design and, thus, can be manufactured at low cost.

SUMMARY OF THE INVENTION

According to the present invention the above and other objects are realized by a measuring transformer which is retained between the flanges of the metal encapsulation of a switch-gear and which includes a sealing and insulating spacing means, the latter means being determinative of the spacing of the aforesaid flanges from each other. More particularly, the spacing means together with the flanges form a ring-shaped cavity which the spacing means seals against the interior of the metal encapsulation. Additionally, at least one iron core having a secondary winding placed thereon is disposed in the ring-shaped cavity, the latter core together with the inner conductor of the high-voltage switch-gear forming a current transformer.

One advantage of the above-described measuring transformer of the present invention is that it permits relative freedom in the design of the iron core cross section profile, which is not the case with measuring transformers housed within the metal encapsulation. For example, the transformer of the present invention permits the use of cores having a relatively large cross-sectional area, as is required particularly for transformers with linear characteristics. In addition, the transformer of the present invention allows the assembly of tape-wound cores after the completion of the entire high-voltage switch-gear installation and, additionally, offers the possibility of replacing tape-wound cores of a certain size with others of different power rating and transformation ratio in a completely assembled switch-gear installation. Also, later changes in the transformation ratio are possible because the present measuring transformer is accessible from the outside. Moreover, it is possible to reduce the size of the metal capsule, where such size was, heretofore, solely determined by the measuring transformer housed in the capsule interior.

The sealing and insulating spacing means of the measuring transformer of the present invention may vary in design. It is considered advantageous, however, if the sealing spacing means comprises an insulating tube and sealing rings located at the faces of the insulating tube. When tightening the flanges of the metal encapsulation, the sealing rings are pressed against the insulating tube, on the one hand, and against the flanges, on the other hand, so that a good seal is achieved at the point of installation of the transformer.

In one embodiment of the present transformer employing spacing means comprising an insulating tube, it is considered advantageous to provide on the portion of the insulating tube's surface facing toward the inner conductor, a conductive coating which forms a capacitor with such inner conductor. The conductive coating may be connected to the grounded metal encapsulation. However, if a voltage measurement is additionally desired, the conductive coating is insulated from the metal encapsulation, and a measuring and/or indicating device is connected to the coating. It is thus possible, merely by applying a conductive coating to the insulating tube and, in addition by using a measuring and/or indicating device to realize, via the present measuring transformer, not only a measurement quantity proportional to the current through the inner conductor, but also a measurement quantity corresponding to the voltage between the inner conductor and the grounded metal encapsulation. Moreover, the cost of such a combined measuring capability in the present transformer is very low.

The aforementioned measuring and/or indicating device employed with the present measuring transformer may differ in design. Advantageously, the measuring portion of the instrument comprises a capacitor which, by being connected to the coating and to the metal encapsulation, acts as the low-voltage capacitor of a capacitive voltage divider whose high-voltage capacitor is formed by the inner conductor and the coating. Connected to the low voltage capacitor is an indicating device which may include an indicating glow lamp, the latter lamp being shunted across the low-voltage capacitor. A monitoring system for the voltage in the high-voltage switch-gear is thus realized, advantageously, in a simple manner. If the ring-shaped cavity including the iron cores and the secondary windings is covered up towards the outside, it is advisable to provide a window in the cover, to be able to observe the indicating glow lamp.

In place of the aforementioned indicating lamp, or in addition to it, there may be connected to the aforesaid low-voltage capacitor, an electro-optical component disposed in a beam of a polarized light. The electro-optical component is followed by an optical transducer and may be mounted inside or outside the ring-shaped cavity. It appears advantageous, however, to accomodate the electro-optical component within the ring-shaped cavity, because it is then protected.

The light source generating the polarized light and the optical transducer may also be disposed inside the ring-shaped cavity, provided this does not require a cavity whose dimensions are unduely large. On the other hand, the light source and the optical transducer may be mounted on the outside of the ring-shaped cavity and the light beam directed through two windows disposed in an outer cover onto the electro-optical component. Advantageously, the electro-optical component may be a Kerr cell or a Pockels cell.

The low-voltage capacitor of the measuring device may be formed in an advantageous manner by means of another conductive coating formed on the portion of the surface of the insulating tube facing away from the conductor of the switch-gear. The insulating tube then forms the dielectric of the low-voltage capacitor.

If applicable, the insulating tube may also serve as support for a paper capacitor winding, housed inside the ring-shaped cavity and used as the low-voltage capacitor.

In another embodiment of the measuring transformer of the present invention which also employs an insulating tube as the sealing and insulating spacing means, a transmitter is disposed on such tube, the latter transmitter being responsive to the magnetic field brought about by the current in the inner conductor of the switch-gear. Such a transmitter may be formed, for example, by a coil disposed on the insulating tube. Additionally, semiconductor components such as "field plates" of Hall-effect generators, may also be employed. The use of such a transmitter does not depend on whether or not the insulating tube has a conducting coating on its inner surface.

Furthermore, it may be advantageous in the latter embodiment for the insulating tube to support on its surface facing toward the inner conductor another transmitter which is responsive to the electric field between the inner conductor and the conductive coating. Such a transmitter may comprise a component which includes a semiconductor material such as used in surface field-effect devices (see, for example, "ETZ-A," 1964, page 822, FIG. 16). Moreover, this transmitter will generally be used only, if its use appears more economical and more advantageous instrumentation-wise than the use of a conductive coating to form a high voltage capacitor.

If applicable, the spacing means of the present transformer may also comprise at least one flange projection, a disc (washer) of insulating material and ring-shaped seals disposed on both sides of the insulating disc. Such a design of the sealing spacing means is particularly advantageous when substantial temperature-caused expansions are to be expected in the high-voltage switch-gear installation. In particular, the thinness of the insulating disc makes it possible to better compensate for the temperature-caused expansion of the screws connecting the flanges, of the flange projections and of the insulating disc. But such a design of the spacing means renders it more difficult to design the measuring transformer to perform both voltage and current measurements.

BRIEF DESCRIPTION OF THE DRAWINGS

The above and other features and aspects of the present invention will become apparent upon reading the following detailed description, viewed in light of the accompanying drawings, in which.

DETAILED DESCRIPTION

Figure 1:
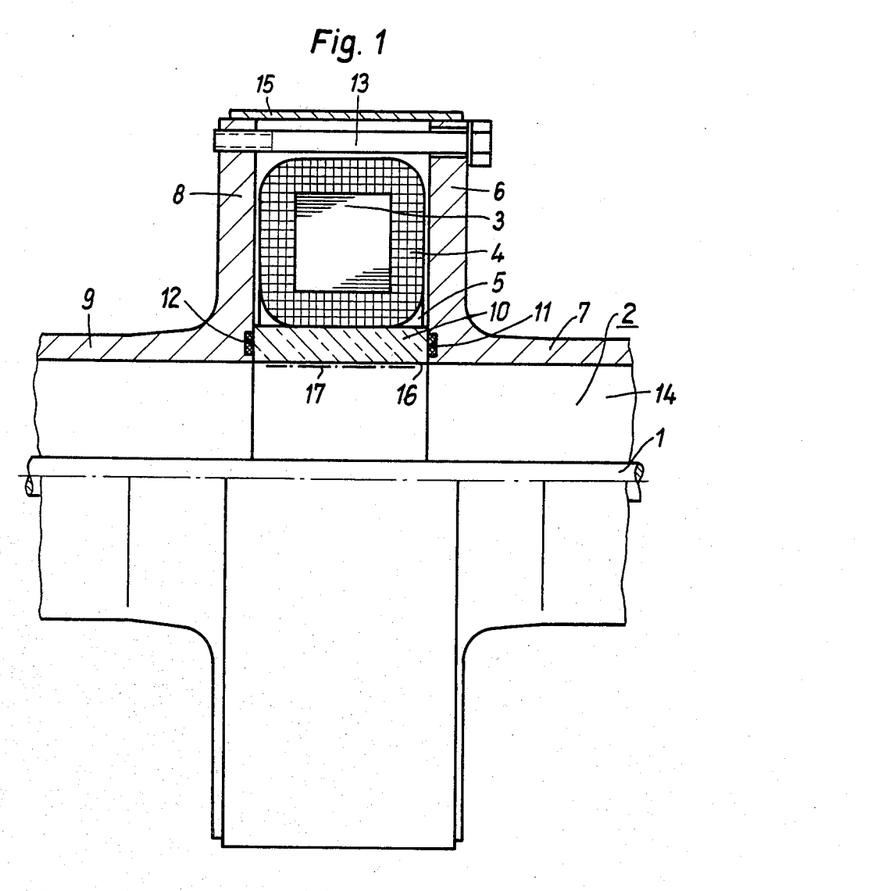
FIG. 1 shows, partly in section and partly in elevation, a first embodiment of a measuring transformer in accordance with the present invention.

The measuring transformer shown in FIG. 1 comprises a primary conductor formed by the inner conductor 1 of the high-voltage switch-gear installation 2 and an iron core 3 on which is placed a secondary winding 4. Iron core 3 and secondary winding 4 are located in a ring-shaped cavity 5 formed at a joint of the metal encapsulation of the switch-gear 2. More specifically, cavity 5 comprises a flange 6 of a part 7 of the metal encapsulation, a flange 8 of another part 9 of the metal encapsulation and an insulating tube 10 which forms a sealing and insulating spacing means for the measuring transformer. Disposed at the end faces of the insulating tube 10 are sealing rings 11 and 12 which seal the interior 14 of the high-voltage switch-gear 2 from the ring-shaped cavity 5 when the flanges 6 and 8 are tightened by means of screws 13. Insulating gas in the high-voltage switch-gear installation 2 can then no longer escape to the outside in an undesired manner. The ring-shaped cavity 5 is closed to the outside by a cylindrical cover 15 which need not be sealed.

Applied to the surface 16 of the insulating tube 10 is a conductive coating 17 which forms one electrode of a high-voltage capacitor of a capacitive voltage divider. The other electrode of the high-voltage capacitor is formed by the inner conductor 1. If the conductive coating 17 is connected via a connecting line, not shown, to a low-voltage capacitor, such as may be disposed outside of the ring-shaped cavity 5, then a capacitive voltage divider is completed. Such a voltage divider makes it possible, for instance, upon connecting an amplifier to the low-voltage capacitor, to obtain at the output of such an amplifier a measured quantity which is proportional to the voltage between the inner conductor 1 and the metal encapsulation 2. The measuring transformer of FIG. 1 is thus configured to take voltage measurements. As will be explained more fully in conjunction with FIG. 2, the measuring transformer of the present invention can be configured to take both voltage and current measurements.

Should the screws 13 be insufficient for a conductive connection of the flanges 6 and 8, additional jumpers may be provided to establish a conductive connection between parts 7 and 9 of the metal encapsulation.

Figure 2:
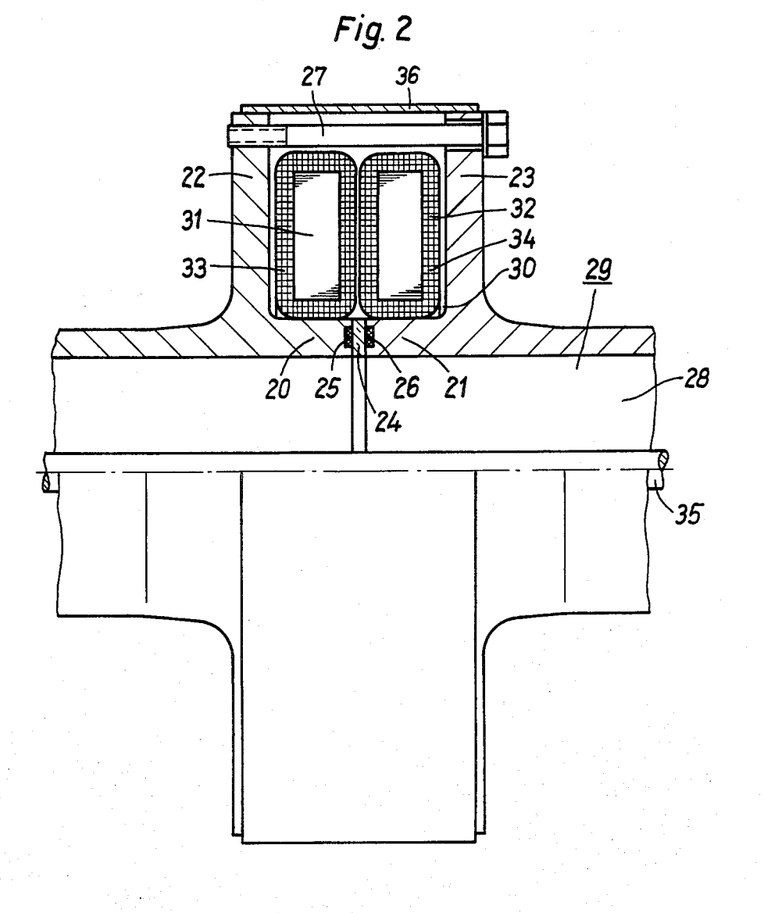
FIG. 2 illustrates, also partly in section and partly in elevation, a second embodiment of the measuring transformer of the present invention.

In the embodiment the present measuring transformer shown in FIG. 2, the insulating and sealing spacing means thereof comprises flange projections 20 and 21 of the flanges 22 and 23 and an insulating material in the form of a disc or washer 24. Associated with the latter, on both sides thereof, are ring-shaped seals 25 and 26. If the flanges 22 and 23 are bolted to each other by means of screws 27, the ring-shaped seals 25 and 26 seal the inner chamber 28 of the high-voltage switch-gear 29 against the ring-shaped cavity 30 formed by the flange projections 20 and 21, the flanges 22 and 23 and the material 24.

As shown in FIG. 2, disposed in the ring-shaped cavity 30 are two iron cores 31 and 32 to which are mounted secondary windings 33 and 34, respectively. These iron cores with the secondary windings 33 and 34, together with the inner conductor 35 of the high-voltage switch-gear 29, acting as the primary conductor, form a current transformer with two active systems. The one iron core 31 may be a metering core, for example, while the other iron core 32 may be a measuring core of greater accuracy. As also shown, the ring-shaped cavity 30 is additionally provided with a cylindrical cover 36 which is removeable. In principle, the cylindrical cover 36 need not be employed.

It should be noted that the embodiments shown in FIGS. 3 to 8 are modifications of the embodiments of FIG. 1 and, thus, similar reference numerals have been used to designate similar parts.

Figure 3:
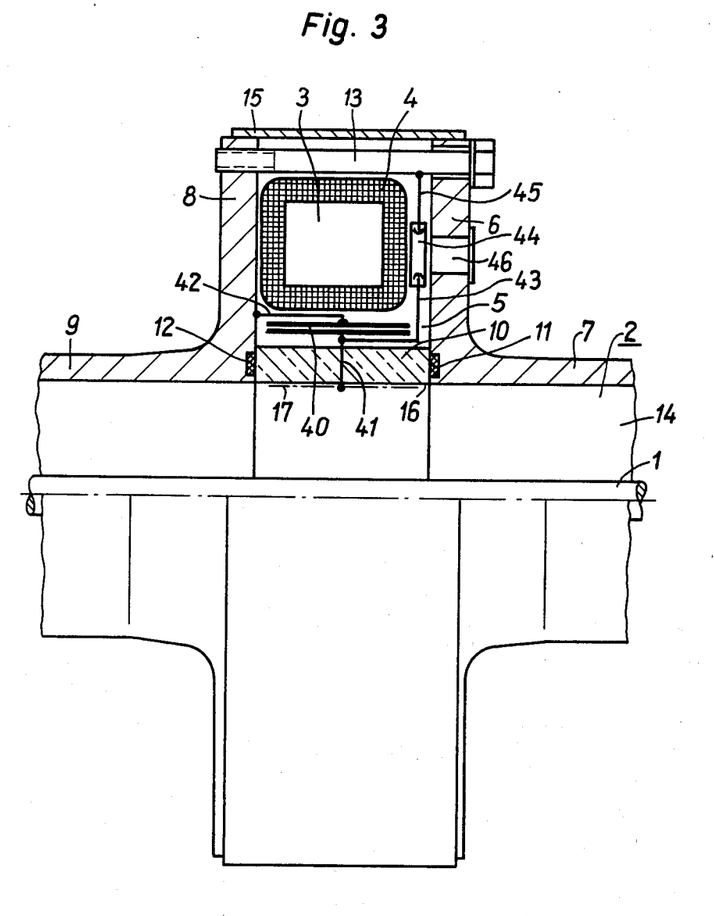
FIGS. 3 to 8 illustrate further embodiments of the present transformer in which different configurations of voltage measuring devices are employed.

More particularly, in FIG. 3, there is included in the ring-shaped cavity 5, in addition to the iron core 3 with the secondary winding 4, a low-voltage capacitor 40 which is connected to the conductive coating 17, via a connecting line 41, and to the grounded flange 8, via another line 42. Also included in the cavity is an indicating glow lamp 44 which is grounded by means of another line 45 and connected to the low-voltage capacitor 40, via a connecting line 43. For observing glow lamp 44, an observation window 46 is provided in the flange 6. With this embodiment of the measuring transformer it is, thus, possible to measure the current in the inner conductor 1 and, in addition, to monitor the voltage between the inner conductor 1 and the metal encapsulation of the high-voltage switch-gear installation 2.

Figure 4:
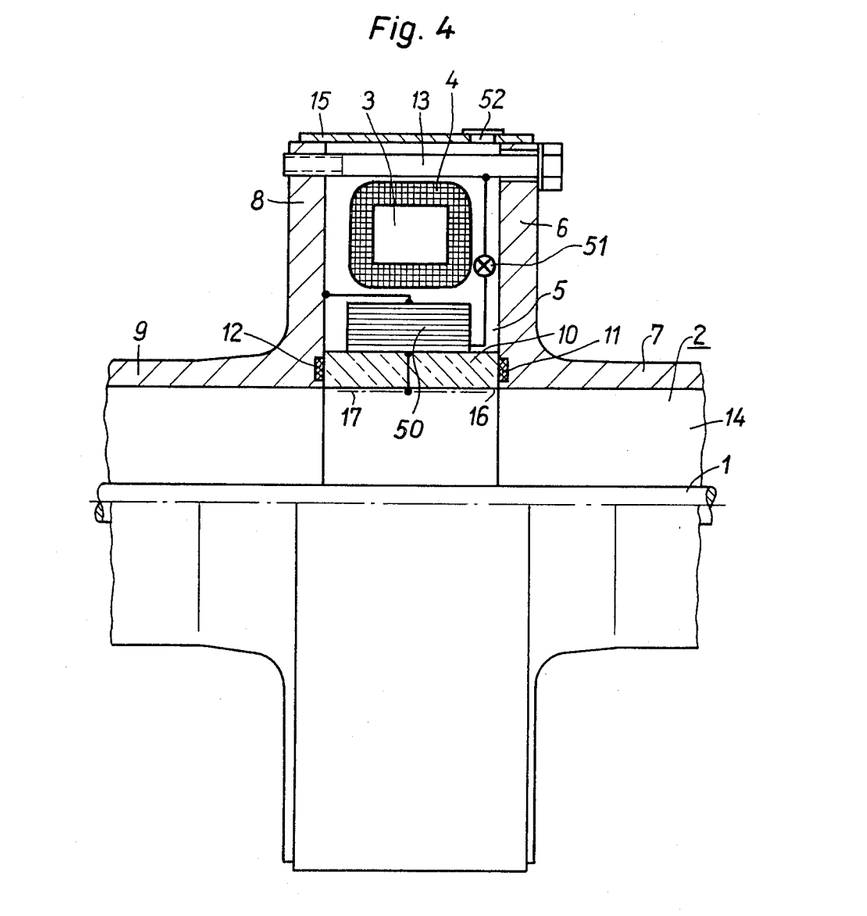

In the embodiment of the invention shown in FIG. 4, included in the cavity 5, adjacent the iron core 3, is a low-voltage capacitor designed as a paper capacitor winding 50. Capacitor 50 is connected to the conducting coating 17, on the one hand, and to the grounded flange 8, on the other hand. For the monitoring of the voltage at the low-voltage capacitor 50 and, hence, also for monitoring the voltage between the inner conductor 1 and the metal encapsulation of the high-voltage switch-gear 2, there is connected to the low-voltage capacitor 50 a signaling lamp 51. The latter lamp, in turn, can be observed through a window 52 in the cylindrical cover 15.

Figure 5:
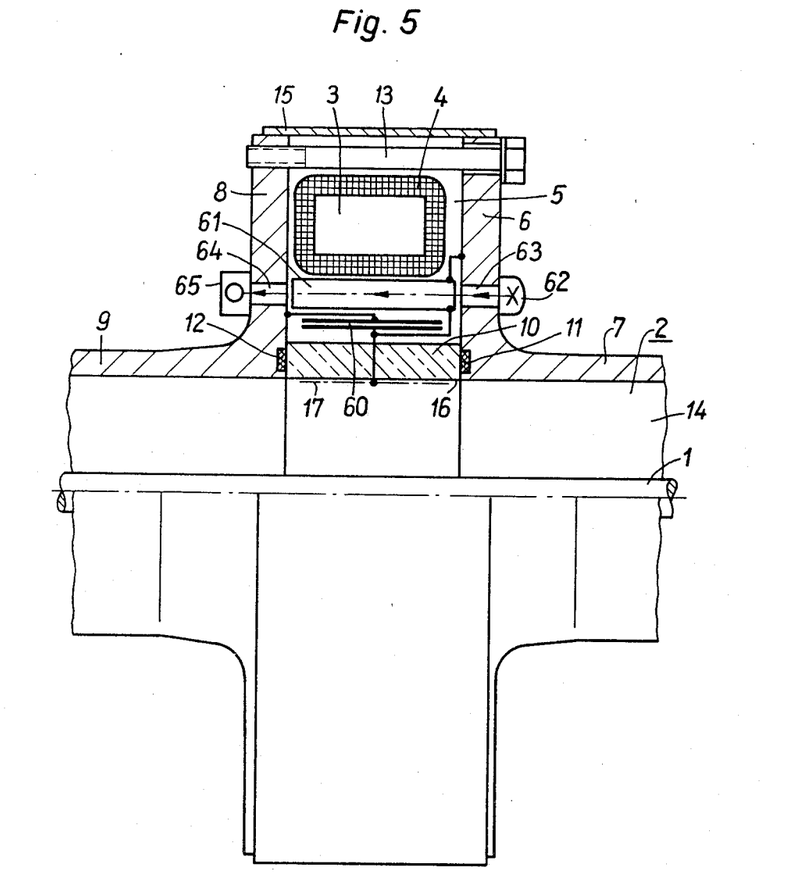

In the embodiment illustrated in FIG. 5, there is housed in the ring-shaped cavity 5, adjacent the iron core 3, for measuring the voltage between the inner conductor 1 and the metal encapsulation of the high-voltage switch-gear 2, a low-voltage capacitor 60 which is connected to a Kerr cell 61. The Kerr cell lies in the path of a light beam which is directed at the cell 61 through a window 63 in the flange 6. The light beam originates from a light source 62 disposed outside the ring-shaped cavity 5. After modulation of the light in the Kerr cell 61 as a function of the voltage level of the capacitor 60, the light exits through another window 64 in the flange 8 and falls onto an optical transducer 65. Therein the light is converted into a voltage corresponding to the voltage between the inner conductor 1 and the metal encapsulation of the high-voltage switch-gear 2.

Figure 6:
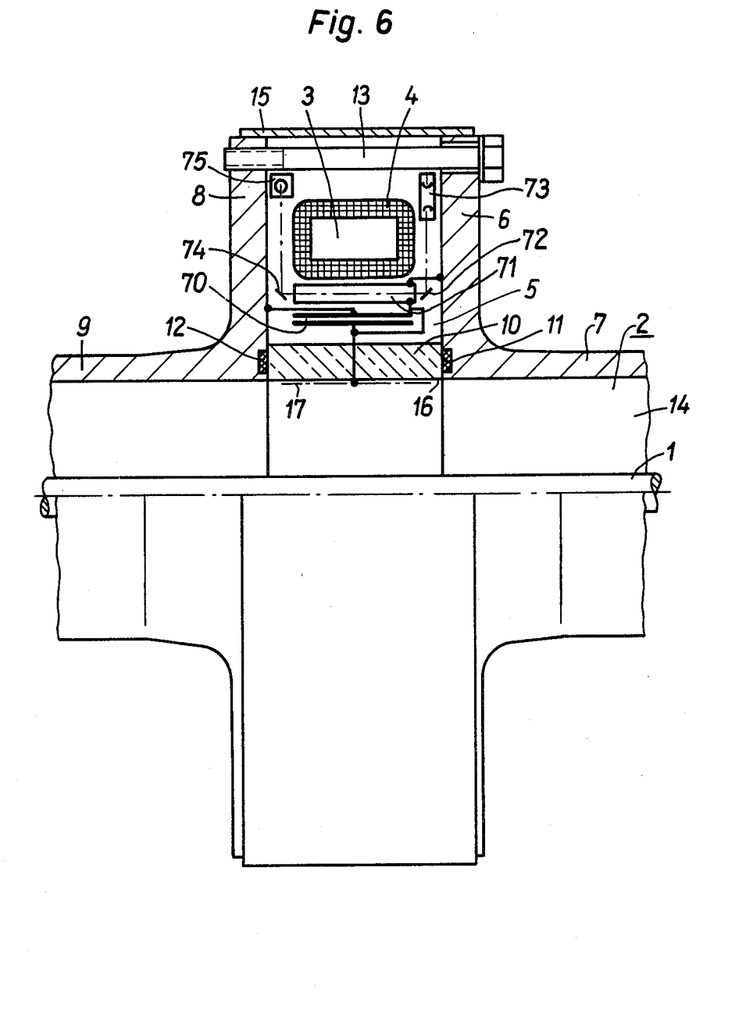

In the embodiment of FIG. 6, the embodiment of FIG. 5 is modified so that all components required for voltage measurement are accommodated within the ring-shaped cavity 5. Thus in addition to the iron core 3, the low-voltage capacitor 70 and Kerr cell 71, the cavity includes a light source 73, reflectors 72 and 74 and a transducer 75. As can be seen, light from source 73 is reflected by reflector 72 through the Kerr cell 71. Thereafter, it is deflected by another reflector 74, onto the optical transducer 75 which generates the desired electric measurement quantity. This measurement quantity, as above noted, is proportional to the voltage between the inner conductor 1 and the metal encapsulation of the high-voltage switch-gear 2.

Figure 7:
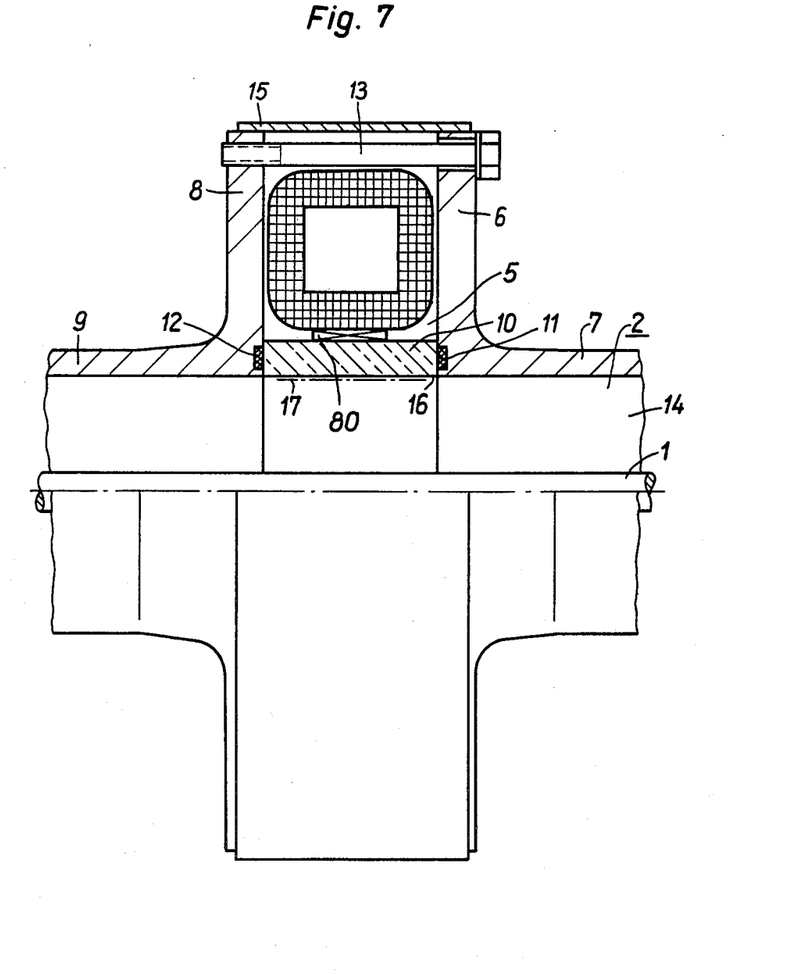

In the embodiment of FIG. 7, the voltage between the inner conductor 1 and the metal encapsulation is derived from a transmitter 80 disposed within the ring-shaped cavity 5. The transmitter 80 may be a field plate or a Hall-effect generator which operates in a known manner to obtain an electric measurement quantity which depends on the magnetic field.

Figure 8:
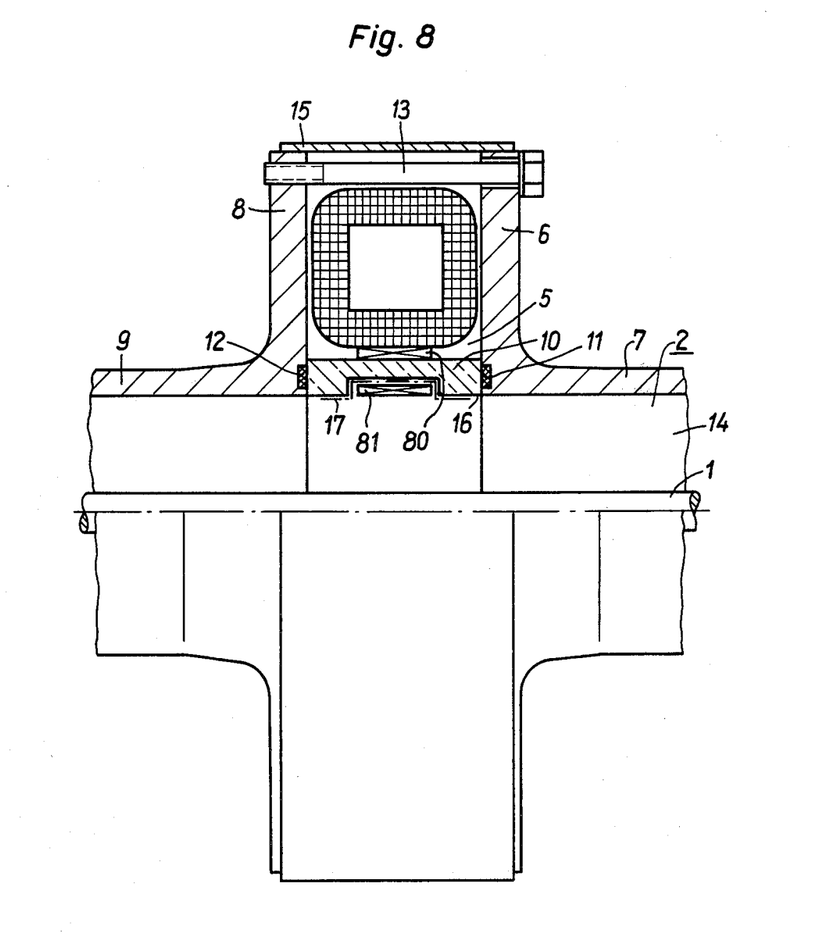

As can be seen from the embodiment of FIG. 8, in addition to the transmitter 80, another transmitter 81 may be disposed in the ring-shaped cavity 5. As shown, this latter transmitter is arranged on the surface of the insulating tube 16 facing the inner conductor 1. It is thus exposed to the electric field between the inner conductor 1 and the conductive coating 17 of the insulating tube 16, and, therefore, can be employed, when appropriately designed, to measure the voltage therebetween. The second transmitter is comprised, advantageously, of a surface field-effect device.

What is claimed is:
1. A measuring transformer for use with a high voltage switch-gear having an inner conductor, metal encapsulation surrounding said inner conductor and forming an inner chamber, and outwardly extending flanges formed by said metal encapsulation at a joint thereof for retaining said transformer, comprising:
   means, including an insulating tube, forming sealing and insulating spacing means, said means being determinative of the spacing of said flanges from each other and forming with said flanges a ring-shaped cavity, outside said inner chamber, said means sealing off said inner chamber of said encapsulation;
   a first conductive layer on the side of said tube facing toward said inner conductor, said layer forming a capacitor with said inner conductor;
   a second conductive layer on the side of said tube facing away from said inner conductor, said second conductive layer forming a capacitor with said first conductive layer on the side of said tube facing toward said inner conductor;
   at least one iron core and a secondary winding disposed thereon, said core being disposed within said cavity and forming a current transformer with said inner conductor; and
   mean for rigidly coupling said sealing and insulating spacing means and said flanges, in a sealing manner.
2. A measuring transformer according to claim 1 wherein said first conductive layer is connected to said metal encapsulation.
3. A measuring transformer in accordance with claim 1 which further includes:

first transmitter means supported by said tube for responding to the magnetic field resulting from the current in said inner conductor.

4. The measuring transformer according to claim 1, wherein said sealing and insulating spacing means comprise: said insulating tube, and sealing rings disposed on the faces of said tube, said sealing rings contacting said flanges and said means for rigidly coupling comprise: bolts at said joint, each bolt extending between and joining said flanges, holding said sealing and insulating spacing means in sealing contact with said flanges.

5. The measuring transformer according to claim 1, wherein said conductive layers comprise first and second conductive coatings on said insulating tube.

6. A measuring transformer in accordance with claim 4 in which said bolts provide a conductive connection between said flanges.

7. A measuring transformer in accordance with claim 1 in which said first conductive layer is insulated from said metal encapsulation, said capacitor formed by said first conductive layer and said inner conductor acting as the high-voltage capacitor of of a capacitive voltage divider and said capacitor formed by said first conductive layer and said second conductive layer acting as the low-voltage capacitor of said voltage divider and further including an indicating device connected to said low-voltage capacitor.

8. A measuring transformer in accordance with claim 7 in which said indicating device includes a glow lamp disposed in said cavity and shunted across said low-voltage capacitor.

9. A measuring transformer in accordance with claim 7 in which said indicating device includes:
an electrode-optical component responsive to the voltage at said low-voltage capacitor;
a light source for directing a beam of polarized light through said component; and
and an optical transducer for receiving light after passage through said component.

10. A measuring transformer for use with a high-voltage switch-gear having an inner conductor, metal encapsulation surrounding said inner conductor and forming an inner chamber, and outwardly extending flanges formed by said meal encapsulation at a joint thereof for retaining said transformer, comprising:
an insulating tube with end faces forming sealing and insulating spacing means, said insulating tube being determinative of the spacing of said flanges from each other and forming with said flanges an open ring-shaped cavity, outside said inner chamber, said insulating tube sealing off said inner chamber of said encapsulation;
a conductive coating disposed on the surface of said tube facing toward said inner conductor, said coating forming a capacitor with said inner conductor, said coating insulated from said metal encapsulation, said capacitor acting as the high-voltage capacitor of a capacitive voltage divider;
a first capacitor connected between said coating and said encapsulation, said first capacitor acting as the low-voltage capacitor of said voltage divider;
an indicating device connected to said low-voltage capacitor;
sealing rings disposed on the end face of said tube;
at least one iron core and a secondary winding disposed thereon, said core being disposed within said cavity and forming a current transformer with said inner conductor; and
means for rigidly coupling said sealing and insulating spacing means and said flanges, in a sealing manner.

11. A measuring transformer in accordance with claim 10 in which said first capacitor comprises a paper capacitor winding supported by said tube and housed in said cavity.

12. A measuring transformer in accordance with claim 11 in which said indicating device includes a glow lamp disposed in said cavity and shunted across said low-voltage capacitor.

13. A measuring transformer in accordance with claim 10 in which said indicating device includes:
an electro-optical component responsive to the voltage at said low-voltage capacitor;
a light source for directing a beam of polarized light through said component; and
an optical transducer for receiving said light after passage through said component.

* * * * *